United States Patent [19]

Sawyer et al.

[11] Patent Number: 5,082,899
[45] Date of Patent: Jan. 21, 1992

[54] MALEIC ANHYDRIDE-GRAFTED POLYOLEFIN FIBERS

[75] Inventors: Lawrence H. Sawyer, Sewell, N.J.; Marvin A. White, Clute; George W. Knight, Lake Jackson, both of Tex.

[73] Assignee: The Dow Chemical Company, Midland, Mich.

[21] Appl. No.: 266,455

[22] Filed: Nov. 2, 1988

[51] Int. Cl.$^5$ .............................................. C08G 63/45
[52] U.S. Cl. ........................................ 525/74; 264/171; 264/210.6; 264/210.8; 428/288
[58] Field of Search ............ 525/74; 264/210.6, 210.8, 264/171; 428/288

[56] References Cited

U.S. PATENT DOCUMENTS

| 4,230,830 | 10/1980 | Tanny et al. |
| 4,394,485 | 7/1983 | Adur |
| 4,460,632 | 7/1984 | Adur et al. |
| 4,644,045 | 2/1987 | Fowells |
| 4,684,576 | 8/1987 | Tabor et al. |
| 4,762,890 | 8/1988 | Strait et al. |

FOREIGN PATENT DOCUMENTS

| 1199746 | 1/1986 | Canada |
| 154197 | 11/1985 | European Pat. Off. |
| 248598 | 12/1987 | European Pat. Off. |
| 3544532 | 12/1985 | Fed. Rep. of Germany |
| 54-30929 | 8/1977 | Japan |
| 2081723 | 8/1980 | United Kingdom |
| 2113696 | 1/1982 | United Kingdom |

OTHER PUBLICATIONS

Kirk Othmer Encyclopedia of Chemical Technology, John Wiley & Sons N.Y. (1981) (3rd Ed.).
Encyclopedia of Polymer Science and Technology, W. von Bergen, ed., Wool Handbook, 3rd ed., Interscience Publishers, a division of John Wiley & Sons, Inc. New York, vol. 1, 1963.

Primary Examiner—James J. Bell

[57] ABSTRACT

Maleic anhydride-grafted HDPE fibers are disclosed. The processing of LLDPE and fibers is enhanced by including HDPE or LLDPE which has been grafted with maleic anhydride to obtain succinic acid or anhydride groups along the linear polyethylene chain in the fiber feed stock. The fibers are formed by extruding molten LLDPE containing the grafted HDPE or LLDPE through an orifice to form a thin fluid stream, melt drawing the thin fluid stream, and quenching the melt drawn thin fluid stream to form a fine denier strand. Biconstituent fibers of LLDPE and grafted HDPE or LLDPE, mixtures of such fibers with other fibers such as polyester, and woven and non-woven fabrics made from such fibers and fiber blends are also disclosed.

42 Claims, No Drawings

MALEIC ANHYDRIDE-GRAFTED POLYOLEFIN FIBERS

Field of the Invention

The present invention pertains to fibers containing maleic anhydride-grafted polyolefin, fibers made of blends of the anhydride-grafted polyolefin and another polyolefin, and fabrics made from such fibers. The invention also pertains to methods for manufacturing polyolefin fibers, and more particularly to processing of polyolefin fibers with maleic anhydride-grafted polyolefin.

Background of the Invention

Various olefin fibers, i.e., fibers in which the fiber-forming substance is any long-chain, synthetic polymer of at least 85 weight percent ethylene, propylene, or other olefin units, are known from the prior art. The mechanical properties of such fibers are generally related in large part to the morphology of the polymer, especially molecular orientation and crystallinity. Thus, crystalline polypropylene fibers and filaments are items of commerce and have been used in making products such as ropes, non-woven fabrics, and woven fabrics. Polypropylene is known to exist as atactic (largely amorphous), syndiotactic (largely crystalline), and isotactic (also largely crystalline). The largely crystalline types of polypropylene (PP), including both isotactic and syndiotactic, have found wide acceptance in certain applications in the form of fibers.

Other types of polyolefins which have been suitably formed into fibers include high density polyethylene (HDPE), and linear low density polyethylene (LLDPE). These polymers are prepared using coordination catalysts and are generally known as linear polymers because of the substantial absence of branched chains of polymerized monomer pendant from the main polymer backbone. LLDPE is a linear ethylene polymer wherein ethylene has been polymerized along with minor amounts of $\alpha$, $\beta$-ethylenically unsaturated alkenes having from three to twelve carbon atoms per alkene molecule, and more typically four to eight. Although LLDPE contains short chain branching due to the pendant side groups introduced by the alkene comonomer and exhibits characteristics of low density polyethylene such as toughness and low modulus, it generally retains much of the strength, crystallinity, and extensability normally found in HDPE homopolymers. In contrast, polyethylene prepared with the use of a free radical initiator, such as peroxide, gives rise to highly branched polyethylenes known as low density polyethylene (LDPE) and sometimes as high pressure polyethylene (HPPE) and ICI-type polyethylenes. Because of unsuitable morphology, notably long chain branching and concomitant high melt elasticity, LDPE is difficult to form into a fiber and has inferior properties as compared to LLDPE, HDPE and PP fibers.

One application of certain fibers such as, for example, polyvinyl chloride, low melting polyester and polyvinylacetate, has been the use of such fibers as binder fibers by blending the binder fiber with high tenacity performance fibers such as polyesters, polyamides, cotton, wool or the like, and heating the fibrous mixture to near the melting point of the binder fiber to thermally weld the binder fiber to the performance fiber. This procedure has found particular application in non-woven fabrics prepared from performance fibers which would otherwise tend to separate easily in the fabric. However, because of the unavailability of reactive sites in the olefin fibers, the bonding of olefin fibers to the performance fibers is characterized by encapsulation of the performance fiber by the melted olefin fiber at the thermal welding site by the formation of microglobules or beads of the olefin fiber. Moreover, it is difficult to achieve suitable thermal welding in this fashion because of the poor wettability of a polar performance fiber by a nonpolar olefin fiber.

Another problem which has hampered the acceptance of olefin fibers is a lack of dyeability. Olefin fibers are inherently difficult to dye, because there are no sites for the specific attraction of dye molecules, i.e., there are no hydrogen bonding or ionic groups, and dyeing can only take place by virtue of weak van der Waals forces. Usually, such fibers are colored by adding pigments to the polyolefin melt before extrusion, and much effort has gone into pigmentation technology for dispersing a dye into the polyolefin fiber. This has largely been unsuccessful because of the poor lightfastness, poor fastness to dry cleaning, generally low color build-up, inflexibility, a necessity for continuous production changes, and the involvement of large inventories. As an alternative, some PP fibers have been modified, for example, with nickel and vinylpyridine.

Olefin fibers are typically fabricated commercially by melt spinning. In this procedure, the molten polymer is expelled through a die, e.g. a spinnerette, with subsequent drawing of the molten extrudate, solidification of the extrudate by heat transfer to a surrounding fluid medium, and taking up of the solid extrudate. Melt spinning may also include cold drawing, heat treating and/or texturizing. An important aspect of melt spinning is the orientation of the polymer molecules by drawing the polymer in the molten state as it leaves the spinnerette. Polyolefins which are not at least partially oriented by melt drawing generally lack suitable mechanical properties and are difficult to further orient by additional drawing of the solid filament. In order to optimize manufacturing processes, it is desirable to spin the fiber at high speeds. In accordance with standard terminology of the fiber and filament industry, the following definitions apply to the terms used herein:

A "monofilament" (also known as "monofil") refers to an individual strand of denier greater than 15, usually greater than 30;

A "fine denier fiber or filament" refers to a strand of denier less than 15;

A "multi-filament" (or "multifil") refers to simultaneously formed fine denier filaments spun in a bundle of fibers, generally containing at least 3, preferably at least 15-100 fibers and can be several hundred or several thousand;

"Staple fibers" refer to fine denier strands which have been formed at, or cut to, staple lengths of generally one to eight inches (2.5 to 20 cm);

An "extruded strand" refers to an extrudate formed by passing polymer through a forming-orifice, such as a die;

A "fibril" refers to a super fine discrete filament embedded in a more or less continuous matrix;

A "biconstituent fiber" refers to a fiber comprising two polymer components in continuous and/or dispersed phases;

A "bicomponent fiber" refers to a fiber comprising two polymer components, each in a continuous phase, e.g. side by side or sheath/core.

Convenient references relating to fibers and filaments, including those of man-made thermoplastics, and incorporated herein by reference, are, for example:

(a) *Encyclopedia of Polymer Science and Technology,* Interscience, New York, vol. 6 (1967), pp. 505–555 and vol. 9 (1968). pp. 403–440;

(b) *Kirk-Othmer Encyclopedia of Chemical Technology,* vol. 16 for "Olefin Fibers", John Wiley and Sons, New York, 1981, 3rd edition;

(c) *Man Made and Fiber and Textile Dictionary,* Celanese Corporation;

(d) *Fundamentals of Fibre Formation—The Science of Fibre Spinning and Drawing,* Adrezij Ziabicki, John Wiley and Sons, London/New York, 1976;

(e) *Man Made Fibres,* by R.W. Moncrieff, John Wiley and Sons, London/New York, 1975.

Other references relevant to this disclosure include U.S. Pat. No. 4,644,045 which describes spun bonded non-woven webs of LLDPE having a critical combination of percent crystallinity, cone die melt flow, die swell, relation of die swell to melt-index, and polymer uniformity; European patent application no. 85101380.5 which describes fine denier fibers and/or multi-filaments of LLDPE; and European patent application no. 87304728.6 which describes a non-woven fabric formed of heat bonded bicomponent filaments having a sheath of LLDPE and a core of polyethylene terephthalate.

In CA 91:22388p (1979) there is described a fiber comprising polypropylene and ethylene-maleic anhydride graft copolymer spun at a 50:50 ratio and drawn 300% at 100° C., and a blend of the drawn fibers and rayon at a 40:60 wt. ratio carded and heated at 145° C. to give a bulky non-woven fabric. However, polypropylene is disadvantageous in some applications because of its relatively high melting point (145° C.), and because of the relatively poor hand or feel imparted to fabrics made thereof. Poor hand is manifested in a relatively rough and inflexible fabric, as opposed to a smooth and flexible fabric.

U.S. Pat. No. 4,684,576 describes the use of blends of HDPE grafted with maleic acid or maleic anhydride to give rise to succinic acid or succinic anhydride groups along the polymer chain with other olefin polymers as an adhesive, for example, in extrusion coating of articles, as adhesive layers in films and packaging, as hot melt coatings, as wire and cable interlayers, and in other similar applications. Similar references describing adhesive blends containing HDPE grafted with unsaturated carboxylic acids, primarily for laminate structures, include U.S. Pat. Nos. 4,460,632; 4,394,485; and 4,230,830; and U.K. patent application nos. 2,081,723 and 2,113,696.

Summary of the Invention

It has now been discovered that biconstituent fibers of LLDPE and maleic acid or anhydride-grafted linear polyolefin, particularly HDPE, can be formed and that such fibers have superior hand, a relatively low melting or bonding temperature, superior adhesive properties and superior dyeability.

In one aspect, the invention provides a method for making a biconstituent LLDPE/graft copolymer fiber. The method includes the steps of extruding a molten mixture of LLDPE and grafted linear polyethylene, preferably free of polypropylene, wherein the linear polyethylene has been grafted with maleic acid or anhydride to obtain succinic acid or anhydride groups along the polyethylene chain, at a temperature of from about 125° C. to about 350° C. to form a thin fluid stream; melt drawing the thin fluid stream; and quenching the melt-drawn thin fluid stream to form a fine denier strand. The linear polyethylene which is grafted is preferably grafted LLDPE (LLDPE$_g$), and especially grafted HDPE (HDPE$_g$).

In a further aspect of the invention, there is provided a fine denier fiber consisting essentially of a melt-drawn biconstituent blend of a grafted linear polyethylene with ungrafted LLDPE, wherein the grafted linear polyethylene is selected from HDPE and LLDPE which has been grafted with maleic acid or anhydride to obtain succinic acid or anhydride groups along the linear polyethylene chain.

In a still further aspect of the invention, there is provided a blend of performance fibers and binder fibers wherein the binder fibers consist essentially of LLDPE and a linear polyethylene selected from HDPE and LLDPE which has been grafted with maleic acid or anhydride to obtain succinic acid or anhydride groups along with the HDPE or LLDPE polymer chain and melt drawn.

In another aspect of the invention, there is provided a fabric including these fibers or fiber blends.

In still another aspect, the invention provides a fabric including such fibers, or fiber blends wherein the binder fibers are bonded to the performance fibers.

Detailed Description and Preferred Embodiments

According to the process of the present invention, a molten grafted linear polyethylene is extruded, melt-drawn and quenched to form a fine denier strand. The grafted linear polyethylene is preferably a grafted HDPE (HDPE$_g$), but a grafted LLDPE (LLDPE$_g$) may also be employed. The density of HDPE before grafting is typically about 0.945–0.970 g/cc, while that of LLDPE before grafting is typically about 0.88–0.945 g/cc. Typically, HDPE and LLDPE will have about the same density before and after grafting, but this can vary depending on the particular HDPE and/or LLDPE properties, graft level, grafting conditions and the like. The HDPE or LLDPE before grafting has a melt index (MI) from about 0.1 to about 1000, but typically less after grafting. For example, HDPE with a 23 MI and a 0.95 g/cc density grafted to a level of 0.7 weight percent maleic anhydride (MA) has a melt index of about 1.35, while the same HDPE grafted to a level of 1.2 weight percent MA has a melt index of about 0.34. Melt index (MI) herein is measured in accordance with ASTM D1238 condition 190° C./2.16 kg (also known as condition "E"). The MI of the HDPE$_g$ or LLDPE$_g$ is selected depending on the specific melt spinning procedure employed and whether or not the grafted polyethylene is employed alone or in a blend with another linear polyethylene.

The grafting of succinic acid or succinic anhydride groups may be done by methods described in the art which generally involve reacting maleic acid or maleic anhydride in admixture with heated polymer, generally using a peroxide or free radical initiator to accelerate the grafting. The maleic acid and maleic anhydride compounds are known in these relevant arts as having their olefin unsaturation sites conjugated to the acid groups. Fumaric acid, an isomer of maleic acid which is also conjugated, gives off water and rearranges to form maleic anhydride when heated, and thus is operable in the present invention. Grafting may be effected in the presence of oxygen, air, hydroperoxides, or other free radical initiators, or in the essential absence of these materials when the mixture of monomer and polymer is maintained under high shear and heat conditions. A convenient method for producing the graft polymer is extrusion machinery, although Brabender mixers or Banbury mixers roll mills and the like may also be used for forming the graft polymer. It is preferred to employ a twin-screw devolatilizing extruder (such as a Werner-Pfleiderer twin-screw extruder) wherein maleic acid or maleic anhydride is mixed and reacted with the HDPE or LLDPE at molten temperatures to produce and extrude the grafted polymer.

The anhydride or acid groups of the grafted polymer generally comprise from about 0.001 to about 10 weight percent, preferably from about 0.01 to about 5 weight percent, and especially from 0.1 to about 1 weight percent of the grafted polymer. The grafted polymer is characterized by the presence of pendant succinic acid or anhydride groups along the polymer chain, as opposed to the carboxylic acid groups obtained by the bulk copolymerization of ethylene with an $\alpha$, $\beta$-ethylenically unsaturated carboxylic acid such as acrylic acid. $HDPE_g$ is the preferred grafted linear polyethylene, and reference is made hereinbelow to $HDPE_g$ by way of example for the sake of simplicity.

The $HDPE_g$ is employed as a constituent in a biconstituent blend with LLDPE. The blend preferably contains from about 0.5 to about 99.5 weight percent of the $HDPE_g$, more preferably from about 1 to 50 weight percent $HDPE_g$, and especially from about 2 to 15 weight percent $HDPE_g$. The biconstituent blend may also include conventional additives, such as dyes, pigments, antioxidants, UV stabilizers, spin finishes, and the like and/or relatively minor proportions of other fiberforming polymers which do not significantly alter the melting properties of the blend or the improved hand obtained in fabrics containing fibers employing LLDPE as a biconstituent blend component, but is preferably essentially free of fiber forming polymers other than the LLDPE and the $HDPE_g$ and particularly essentially free of polypropylene.

The LLDPE employed, either as the grafted linear polyethylene constituent or as the ungrafted constituent in the biconstituent fiber, comprises at least a minor amount of olefinically unsaturated alkene having from 3 to 12 carbon atoms, preferably from 4 to 8 carbon atoms, and 1-octene is especially preferred. The alkene may constitute from about 0.5 to about 35% by weight of the LLDPE, preferably from about 1 to about 20 weight percent, and most preferably from about 2 to about 15 weight percent.

The $HDPE_g$ and the LLDPE may be blended together prior to extrusion, either by melt blending or dry blending. Dry blending of pellets of the $HDPE_g$ and the LLDPE prior to extrusion is generally adequate where the melt indices of the blend components are similar, and there will generally be no advantage in melt blending such blend constituents prior to extrusion. However, where melt blending may be desired, as in the case of $HDPE_g$ and LLDPE of dissimilar melt indices, melt blending may be accomplished with conventional blending equipment, such as, for example, mixing extruders, Brabender mixers, Banbury mixers, roll mills and the like.

Extrusion of the polymer through a die to form a thin fluid stream is effected using conventional equipment such as, for example, extruders, gear pumps and the like. It is preferred to employ an extruder which feeds a gear pump to supply the molten blend to the die. The blend is preferably mixed in a mixing zone of the extruder and/or in a static mixer, for example, upstream of the gear pump in order to obtain a more uniform dispersion of the polymer blend constituents.

The extrusion die may be a conventional die, such as, for example, a spinnerette generally containing three or more orifices up to several hundred or several thousand, e.g. from about 500 to about 30,000 depending on the process, but the number of orifices is not particularly critical and 15 to 100 are generally sufficient. The spinnerette typically includes a filter element to remove gels and other impurities which might otherwise foul or clog the spinnerette orifices. The spinnerette also typically includes a breaker plate to uniformly distribute the molten polymer to all orifices of the spinnerette and to assist in orienting the polymer molecules. The molten polymer is preferably supplied from the extruder and/or gear pump to the spinnerette at a pressure of from about 345 to about $6.9 \times 10^4$ KPa, and a spinning pressure of $1.38 \times 10^3$ to $6.9 \times 10^3$ KPa is preferred. The blend may be spun at a temperature of from about 125° C. to about 350° C., preferably 170° C. to 300° C.

Following extrusion through the die, the resulting thin fluid strands remain in the molten state for some distance before they are solidified by cooling in a surrounding fluid medium, which may be chilled air blown through the strands, and is taken up in solid form on a godet or another take-up surface. In a staple forming process, the strands are taken up on a godet which draws down the thin fluid streams in proportion to the speed of the take-up godet. In the jet process, the strands are collected in a jet, such as, for example, an air gun, and blown onto a take-up surface such as a roller or moving belt. In the melt blown process, air is ejected at the surface of the spinnerette which serves to simultaneously draw down and cool the thin fluid streams as they are deposited on a take-up surface in the path of the cooling air. Regardless of the type of melt spinning procedure which is used, it is important that the thin fluid streams be melt drawn down in a molten state, i.e. before solidification occurs. At least some drawdown is necessary in order to orient the polymer molecules for good tenacity. It is not generally sufficient to solidify the thin fluid streams without significant extension before take up, as the fine strands which are formed thereby can hardly be cold drawn, i.e. in a solid state below the melting temperature of the polymer, because of their low tenacity. On the other hand, when the thin fluid streams are drawn down in the molten state, the resulting strands can more readily be cold drawn because of the improved tenacity imparted by the melt drawing.

Melt drawdowns of up to about 1:1000 may be employed, preferably from about 1:10 to about 1:200, and especially 1:20 to 1:100.

Where the staple-forming process is employed, it may be desirable to cold draw the strands with conventional drawing equipment, such as, for example, sequential godets operating at differential speeds. The strands may also be heat treated or annealed by employing a heated godet. The strands may further be texturized, such as, for example, by crimping and cutting the strand or strands to form staple. In the spun bonded or air jet processes, cold drawing of the solidified strands and texturizing is effected in the air jet and by impact on the take-up surface, respectively. Similar texturizing is effected in the melt blown process by the cooling fluid which is in shear with the molten polymer strands, and which may also randomly delinearize the thin fluid streams prior to their solidification.

The fibers so formed by the above described process also constitute a part of the present invention. The fibers are generally fine denier filaments of 15 denier or less down to fractional deniers, preferably in the range of from 1 to 10 denier, although this will depend on the desired properties of the fibers and the specific application in which they are to be used.

The biconstituent fibers of the present invention may comprise a continuous phase of either the $HDPE_g$ or LLDPE with the other component being dispersed therein in a matrix/fibril orientation. Bicomponent fibers may also be obtained in which each $HDPE_g$ and LLDPE constituent is in a continuous phase, such as, for example, in a side by side orientation or a sheath of the $HDPE_g$ or LLDPE around a core of the other component. The distribution of the two components in the biconstituent blend fibers will depend largely on the compatibility, i.e. melt miscibility, of the blend constituents and the relative proportions thereof. For example, a large amount of $HDPE_g$ of relatively high melt index blended with a relatively lesser proportion of LLDPE of low melt index generally forms a biconstituent fiber in which fibrils of the LLDPE are dispersed in a continuous or generally continuous phase of the $HDPE_g$ matrix. The distribution of the components in such cases will also depend to a lesser extent upon the extent of mixing achieved prior to extrusion.

The fibers of the present invention have a wide variety of potential applications. For example, the fibers may be formed into a batt and heat treated by calendaring on a heated, embossed roller to form a fabric. The batts may also be heat bonded, for example, by infrared light, ultrasound or the like, to obtain a high loft fabric. The fibers may also be employed in conventional textile processing such as carding, sizing, weaving and the like. Woven fabrics made from the fibers of the present invention may also be heat treated to alter the properties of the resulting fabric.

A preferred embodiment of the invention resides in the employment of the fibers formed according to the process of the invention in binder fiber applications with high tenacity performance fibers such as, for example, polyamides, polyesters, cotton, wool, silk, cellulosics, modified cellulosics such as rayon and rayon acetate, and the like. The fibers of the present invention find particular advantage as binder fibers owing to their adhesion to performance fibers and wettability thereof which is enhanced by the presence of the acid groups in the $HDPE_g$ constituent and the relatively lower melting temperature or range of the $HDPE_g$ constituent relative to the performance fiber. The relative proportions of the binder fiber of the present invention employed in admixture with performance fibers in a fiber blend will depend on the desired application and capabilities of the resulting fiber mixture and/or fabric obtained thereby. It is preferred to employ from about 5 to about 95 parts by weight of the binder fiber per 100 parts by weight of the binder fiber/performance fiber mixture, more preferably from about 5 to about 50 parts by weight binder fiber, and especially 5 to 15 parts by weight binder fiber.

In preparing non-woven fabrics from the binder fiber/performance fiber blend of the invention, there are several important considerations. Where the binder fibers are in staple form, there should be no fusing of the fibers when they are cut into staple, and the crimp imparted to the binder fibers should be sufficient for blending with the performance fibers to obtain good distribution of the fibers.

The ability of the binder fibers to adhere to or to wet the performance fibers is another important consideration. Adhesion and wettability can generally be controlled by varying the acid content of the binder fiber, either by the level of graft of maleic acid or anhydride in the $HDPE_g$, or by the proportion of the $HDPE_g$ blended with the LLDPE constituent in the binder fibers. In typical non-woven fabrics obtained by thermally welding the performance fibers with a binder fiber, the ability of the binder fibers to bond together the performance fibers depends largely on the thermal welding of the performance fibers together by the binder fibers. In typical prior art non-woven fabrics employing binder fibers, the binder fiber thermally bonds performance fibers together by at least partially melting to form globules or beads which encapsulate the performance fibers. The binder fibers of the present invention enhance the non-woven fabric by providing greater adhesion of the binder fiber to the performance fiber and/or better wettability thereof. Employing the binder fibers of the present invention, it is also possible to obtain thermal bonding of the binder fiber to a performance fiber by partial melting and contact adhesion in which the binder fibers largely retain their fibrous form, and the resulting non-woven fabric is characterized by a reduced number of globules or beads formed by the melting of the binder fibers.

It is also important for the binder fiber to have a relatively broad melting point range, particularly where hot calendaring is employed to obtain a thermal bonding of a non-woven or woven fabric. A good indication of melting point range is the difference between the Vicat softening point and the peak melting point determined by differential scanning calorimetry (DSC). Narrow melting point ranges present a difficult target for process bonding equipment such as a calendar roll, and even slight variations in the temperature of bonding equipment can result in an insufficient bond to be formed between the binder fibers and the performance fibers. If too low a temperature is employed, the binder fibers will not sufficiently fuse, whereas when too high a temperature is employed, the binder fiber may completely melt and run right out of the performance fiber batt. Thus, a broad melting point range is desired in order that partial fusion of the binder fiber material can be achieved without a complete melting. A melting point range of at least 7.5° C. is desired for proper thermal bonding, and preferably a sufficiently broad melting point range that a minimum 10° C. bonding window is obtained.

Another important characteristic of binder fibers is that when they are melted in equipment such as a calendar roll, they will have a sufficient melt viscosity to be retained in the fiber matrix and not readily flow therefrom. An important advantage of the binder fibers of the present invention is that they have generally higher melt viscosity than fibers consisting of ungrafted LLDPE and/or ungrafted HDPE. In addition to using a calendar roll, bonding of the present binder fibers can also be obtained using other bonding techniques, e.g. with hot air, infrared heaters, and the like.

The invention is illustrated by way of, but not limited to, the examples which follow.

EXAMPLE 1

A blend of 10 parts by weight HDPE (melt index 10, density 0.964 g/cc) grafted with 0.65 weight percent maleic anhydride and 90 parts by weight LLDPE (melt index 6, density 0.919 g/cc) was extruded on a standard screw extruder (a barrier screw with a Maddox mixing zone) with an L/D of 24/1 at 220° C. The molten extrudate was fed through a 5-element Kimix static mixer and a Zenith gear pump (1.168 ml/revolution) into a spin pack including a filter (stainless steel elements porosity 40 microns), a Mott breaker plate and a spinnerette having 34 600-micron holes with an L/D of 4/1. The molten filaments from the spinnerette were drawn down to about 18 denier by the extensional force of a draw down godet, and cold drawn at 3:1 by a speed differential in sequential godets. The resulting approximately 6 denier filaments were taken up on a winder at 1000 m/min.

EXAMPLE 2

A blend was made of 10 parts by weight of HDPE (melt index 10, density 0.962 g/cc) grafted with 0.13% weight percent maleic anhydride, with 90 parts by weight LLDPE (melt index 6, density 0.919 g/cc). The blend was fabricated into fiber on the equipment of Example 1 with an extruder temperature of 183° C., a draw down godet speed of 610 rpm, and sequential godet speeds of 665 rpm and 1912 rpm. The resulting fibers had a denier of 6.5, a melt index of 4.93, a tenacity of 2.80 g/denier, an elongation at break of 125 percent, and a density of 0.925 g/cc. The fibers were chopped on an elliptical cog-type chopper into 2-inch (5 cm) uncrimped staple. These staple fibers were blended at 30 parts by weight with 70 parts by weight of a DuPont polyester staple (6 denier, 3.8 cm). The HDPE/LLDPE$_g$ fibers did not produce an optimum blend because they were uncrimped and because of the presence of some fused ends therein which may have resulted from a dull chopper blade in the chopping step. The blended fiber was carded on a Rando-Webber model card and fabricated into a 255 g/m² batt. The batt was heat sealed by conveying it through a 2.44 m long infrared oven with 3 heating elements suspended 45.7 cm above the conveyor to give a free loft specimen for an air filter. The heat-sealed batt had a thickness of 1.76 cm, a Mullen burst of 345 KPa, a tensile strength of 420 g and an elongation at break of 287 percent.

COMPARATIVE EXAMPLE 2

An LLDPE (melt index 30.4, density 0.9428 g/cc) was spun and formed into heat-sealed batt for comparison with the HDPE$_g$/LLDPE blend of Example 2. The LLDPE was spun at 190° C. on 4 spinnerettes with 74 600-micron diameter, 4mm long holes each, at a flow rate of 0.82 cc/min per hole. A 1.5 percent spin finish of a 9/4/1 mixture of water/Nopcosiat GOS/Dacospin HC was applied, and mechanical take-up was accelerated after start up to 500 m/min. The output rate was gradually decreased until a 10 denier fiber was obtained. The 10 denier fiber was cold drawn to 2.6 denier, crimped and cut to 4.5-5.1 cm staple. The staple was blended with polyester, carded and heat sealed as in Example 2. The resulting batt had a thickness of 2.2 cm, a Mullen burst of 138 KPa, a tensile strength of 460 g, and an elongation at break of 157 percent.

EXAMPLE 3

Fibers were made from a 10 weight percent HDPE$_g$/90 weight percent LLDPE blend. The HDPE$_g$ contained 1.2 weight percent maleic anhydride, and had a melt index of 0.344 and a density of 0.9541 g/cc. The LLDPE had a melt index of 22.6 and a density of 0.9167 g/cc. The resins were tumble blended for 30 minutes and spun on the equipment described in Example 1 using a spinning temperature of 203° C., a drawdown godet speed of 300 rpm, and sequential godet speeds of 1205 rpm, 1205 rpm at 60° C., and 1180 rpm. The resulting fibers had a denier of 5.28, a tenacity of 1.99 g/denier and an elongation of 170%. The melting point breadth of the fiber material was about 34.2° C. (the difference between the Vicat softening point (90.3° C.) and the DSC peak melting point (124.5° C.)). The fibers were creeled from three cores of 68 filaments per bundle (about 408 denier/bundle) to one core of about 1224 denier/bundle.

This 1224 denier core is then further creeled to one core with a denier of about 7344 denier per bundle, crimped and cut into staples. These staples are mixed at 25 parts by weight with 75 parts by weight DuPont polyester fiber and formed into a batt as described in Examples 1 and 2. A 7 oz/sq yd batt is heat sealed by infrared light as described in Examples 1 and 2 to obtain a heat sealed batt with a thickness of about 0.48 cm, a Mullen burst of about 427 KPa, and a grab tensile strength of about 7000 g in the machine direction and 1340 g in the cross direction.

EXAMPLE 4

HDPE$_g$-containing fibers were prepared as in Example 3 using a blend of 10 weight percent HDPE grafted with 1.2 weight percent maleic anhydride (melt index 0.344, density 0.9541 g/cc) and 90 weight percent LLDPE (melt index 26.23, density 0.9419 g/cc). The blend was spun at 203° C. with a drawdown godet speed of about 302 rpm and sequential godet speeds of about 320 rpm and 625 rpm/60° C. The resulting fibers had a denier of 6.33, a tenacity of 1.66 g/denier, and an elongation of 277 percent. The fiber material had a Vicat softening point of 119.9° C., an initial DSC melting point of 127.5° C. and a melting point breadth of 7.5° C. The fibers were creeled to about 1224 denier.

The fibers are further creeled to about 7344 denier, crimped and cut into staples which are then blended with polyester, formed into batts and heat sealed as in Example 3. The infrared heat-sealed batt has a thickness of about 0.41 cm, a Mullen burst of about 2.83×10² KPa, and a tensile strength of about 2330 g in the machine direction and 840 g in the cross direction.

The foregoing is illustrative and explanatory of the invention, and various modifications of the size, shape, materials and processing conditions will occur to those skilled in the art. It is intended that all such variations which fall within the scope and spirit of the appended claims be embraced thereby.

What is claimed is:
1. A fiber, consisting essentially of:
   a biconstituent blend of ungrafted linear low density polyethylene and grafted high density polyethylene or linear low density polyethylene wherein the high density polyethylene or linear low density polyethylene has been grafted with maleic acid or anhydride to obtain succinic acid or anhydride groups along the polymer chain, and wherein the blend has been melt-drawn to form a fine denier strand having a melting point range of at least 7.5° C.

2. The invention of claims 1, wherein the biconstituent blend fiber has a denier less than about 15.

3. The invention of claim 1, wherein the biconstituent blend fiber has a denier of from about 1 to about 15.

4. The invention of claim 1, wherein the biconstituent blend fiber has a denier less than about 10.

5. The invention of claim 1, wherein the grafted high density polyethylene has an ASTM d-1238 melt index of from about 0.01 to about 1000 g/10 min at condition 190° C./2.16 kg.

6. The invention of claim 3, wherein the grafted high density polyethylene has a melt index of from about 0.1 to about 300.

7. The invention of claim 1, wherein the succinic acid and anhydride groups comprise from about 0.001 to about 10 weight percent of the grafted high density polyethylene.

8. The invention of claim 1, wherein the succinic acid and anhydride groups comprise from about 0.01 to about 5 weight percent of the grafted high density polyethylene.

9. The invention of claim 1, wherein the succinic acid and anhydride groups comprise from about 0.1 to about 1 weight percent of the grafted high density polyethylene.

10. The invention of claim 1, wherein the grafted high density polyethylene comprises from about 0.5 to about 99.5 weight percent of the biconstituent fiber.

11. The invention of claim 1, wherein the biconstituent fiber comprises from about 1 to about 50 weight percent of the grafted high density polyethylene.

12. The invention of claim 1, wherein the biconstituent fiber comprises from about 5 to about 15 weight percent of the grafted high density polyethylene.

13. A method for making the fiber of claim 1, comprising the steps of:
extruding a molten mixture consisting essentially of a biconstituent blend of linear low density polyethylene and grafted linear polyethylene, wherein the linear polyethylene has been grafted with maleic acid or anhydride to obtain succinic acid or anhydride groups along the polyethylene chain, at a temperature of 125° C. to 350° C. to form a thin fluid stream;
melt drawing the thin fluid stream; and quenching the melt drawn thin fluid stream to form a fine denier strand.

14. The method of claim 13 wherein the grafted linear polyethylene has a melt index of from about 0.1 to about 1000.

15. The method of claim 13, wherein the succinic acid and anhydride groups comprise from about 0.001 to about 10 weight percent of the grafted linear polyethylene.

16. The method of claim 13, wherein the drawdown ratio is from about 1:1 to about 1000:1.

17. The method of claim 13, further comprising cold drawing the fine denier strand.

18. The method of claim 13, further comprising texturizing the fine denier strand.

19. The method of claim 13, wherein the grafted linear polyethylene is grated high density polyethylene.

20. The method of claim 19, wherein the grafted high density polyethylene has a density of from about 0.945 g/cc to about 0.970 g/cc.

21. The method of claim 13, wherein the grafted linear polyethylene grafted linear low density polyethylene.

22. The method of claim 21, wherein the grafted linear low density polyethylene has a density of from about 0.88 g/cc to about 0.945 g/cc.

23. A method for making the fiber of claim 1, comprising the steps of:
extruding a biconstituent blend of linear low density polyethylene and grafted high density polyethylene through a die at a temperature of 125° C. to 350° C. to form a thin fluid biconstituent stream, wherein the grafted high density polyethylene comprises high density polyethylene grafted with maleic acid or maleic anhydride to obtain from about 0.001 to about 10 weight percent of succinic acid or anhydride groups along the high density polyethylene polymer chain, and wherein the grafted high density polyethylene has a melt index of from about 0.1 to about 1000 and a density of from about 0.945 g/cc to about 0.970 g/cc;
melt drawing the thin fluid stream at a draw down of from about 1:1 to about 1000;1; and
quenching the melt drawn thin fluid stream to form a biconstituent fine denier strand.

24. The method of claim 23, wherein the die is a spinnerette and the fine denier strand is taken up on a godet.

25. The method of claim 24, wherein the grafted high density polyethylene has a melt index of from about 0.1 to about 100.

26. The method of claim 24, wherein the grafted high density polyethylene has a melt index of from about 1 to about 30.

27. The method of claim 24, further comprising cold drawing the fine denier strand at a draw down of from about 1:1 to about 20:1.

28. The method of claim 24, further comprising texturizing the fine denier strand.

29. The method of claim 24, further comprising forming the fine denier strand into staple.

30. The method of claim 24, further comprising crimping and chopping the fine denier strand.

31. The method of claim 23, wherein the die is a spinnerette and the fine denier strand is taken up with an air jet.

32. The method of claim 31, wherein the air jet deposits the fine denier strand on a roller or moving belt.

33. The method of claim 32, further comprising heat sealing the fine denier strand taken up on the roller or belt.

34. The method of claim 31, wherein the grafted high density polyethylene has a melt index of from about 10 to about 125.

35. The method of claim 31, wherein the grafted high density polyethylene has a melt index of from about 15 to about 60.

36. The method of claim 13, wherein the thin fluid stream is melt blown onto a take-up surface.

37. The method of claim 36, wherein the grafted high density polyethylene has a melt index of from about 75 to about 1000.

38. The method of claim 23, wherein the linear low density polyethylene has a melt index of from about 0.1 to about 1000 and a density from about 0.88 g/cc to about 0.945 g/cc.

39. The method of claim 38, wherein the blend consists essentially of from about 0.5 to about 99.5 weight percent grafted high density polyethylene and from about 99.5 to about 0.5 weight percent high density polyethylene.

40. The method of claim 38, wherein the blend consists essentially of from about 1 to about 50 weight percent grafted high density polyethylene and from about 99 to about 50 weight percent linear low density polyethylene.

41. The method of claim 38, wherein the blend consists essentially of from about 5 to about 15 weight percent grafted high density polyethylene and from about 95 to about 85 weight percent linear low density polyethylene.

42. A biconstituent fiber prepared by the process of any of claims 13-41.

* * * * *

UNITED STATES PATENT AND TRADEMARK OFFICE
CERTIFICATE OF CORRECTION

PATENT NO. : 5,082,899

DATED : January 21, 1992

INVENTOR(S) : Lawrence H. Sawyer et al

It is certified that error appears in the above-identified patent and that said Letters Patent is hereby corrected as shown below:

Title page, item [56] References Cited - under U.S. PATENT DOCUMENTS, please add U.S. patent number "4,578,414".

Col. 11, Claim 2, line 1, change "claims" to read --claim--.

Col. 11, Claim 5, line 2, change "d-1238" to read --D-1238--.

Col. 11, Claim 6, line 1, change "claim 3" to read --claim 5--.

Col. 11, Claim 8, line 1, change "claim 1" to read --claim 7--.

Col. 12, Claim 36, line 1, change "claim 13" to read --claim 23--.

Signed and Sealed this

Sixth Day of July, 1993

Attest:

MICHAEL K. KIRK

Attesting Officer

Acting Commissioner of Patents and Trademarks